(12) United States Patent
Heinonen et al.

(10) Patent No.: US 7,031,663 B2
(45) Date of Patent: Apr. 18, 2006

(54) SYSTEM FOR PERFORMING ENVIRONMENTAL MEASUREMENTS AND FOR TRANSFERRING MEASUREMENT RESULTS

(75) Inventors: Pekka Heinonen, Espoo (FI); Harri Okkonen, Espoo (FI)

(73) Assignee: Nokia Mobile Phones, Ltd., Espoo (FI)

( * ) Notice: Subject to any disclaimer, the term of this patent is extended or adjusted under 35 U.S.C. 154(b) by 1057 days.

(21) Appl. No.: 09/263,402

(22) Filed: Mar. 5, 1999

(65) Prior Publication Data
US 2002/0119769 A1  Aug. 29, 2002

(30) Foreign Application Priority Data
Mar. 9, 1998  (FI) .................................. 980538

(51) Int. Cl.
*H04B 17/00* (2006.01)
(52) U.S. Cl. .................. 455/67.11; 455/404.1; 455/423; 455/561; 340/511; 340/539
(58) Field of Classification Search ........... 455/404, 455/423, 521, 524, 67.1, 561, 504, 505; 340/539, 340/511, 905
See application file for complete search history.

(56) References Cited

U.S. PATENT DOCUMENTS

| 4,665,385 A | * | 5/1987 | Henderson .................. 340/539 |
| 4,814,711 A |   | 3/1989 | Olsen et al. ................ 324/331 |
| 4,972,507 A | * | 11/1990 | Lusignan .................... 455/503 |
| 5,131,020 A | * | 7/1992 | Liebesny et al. ........... 455/422 |
| 5,349,630 A |   | 9/1994 | Sointula ...................... 379/58 |
| 5,552,772 A | * | 9/1996 | Janky et al. .............. 340/573.4 |
| 5,568,535 A |   | 10/1996 | Sheffer et al. ................ 379/39 |
| 5,729,197 A |   | 3/1998 | Cash .......................... 340/539 |
| 5,799,255 A |   | 8/1998 | Berg et al. .................. 455/551 |
| 6,031,455 A | * | 2/2000 | Grube et al. ................ 340/539 |
| 6,112,074 A | * | 8/2000 | Pinder ........................ 455/404 |
| 6,154,648 A | * | 11/2000 | Comer ........................ 455/426 |

FOREIGN PATENT DOCUMENTS

| DE | 43 21 037 | 2/1995 |
| EP | 0 622 625 A3 | 11/1994 |
| EP | 0 655 873 A2 | 5/1995 |
| EP | 0 690 639 A2 | 1/1996 |
| FI | 943090 | 12/1995 |
| GB | 2 233 088 A | 1/1991 |
| WO | WO 96/35286 | 11/1996 |
| WO | WO 97/49077 | 12/1997 |

OTHER PUBLICATIONS

Finnish Office Action.
Finnish Official Action.

* cited by examiner

*Primary Examiner*—Temica Beamer
(74) *Attorney, Agent, or Firm*—Perman & Green, LLP

(57) ABSTRACT

Automatic environmental measuring stations (10, 10a, 10b, 10c) are connected in a physical connection with base stations (11; 11a; 11b; 11c) of a cellular radio system which stations measure certain basic phenomena of the atmosphere and/or the concentrations of certain substances in the air. The information of the measurements is transferred using a base station over the cellular radio system to a central equipment (14) either as regular reports or as acute alarms if any alarm limit is exceeded. The information may also be transmitted over the base station of the cellular radio system to mobile stations (15) in the area of the base station in the form of individually tailored reports and alarms.

24 Claims, 3 Drawing Sheets

SYSTEM FOR PERFORMING ENVIRONMENTAL MEASUREMENTS AND FOR TRANSFERRING MEASUREMENT RESULTS

FIELD OF THE INVENTION

The present invention concerns an environmental measuring system and a method for performing environmental measurements on a certain geographical area and for transferring measurement results. The invention relates to an environmental measuring system and a method for performing environmental measurements on a large geographical area.

BACKGROUND OF THE INVENTION

The basic phenomena of the atmosphere, such as wind, temperature, air pressure, humidity and rains vary largely already at distances of a few hundred kilometers and sometimes already even in the scale of ten kilometers. These have a great effect on any outdoor activities, because of which people desire for accurate information on situation and reliable prognoses. The air further carries with it rapidly different kinds of impurities, such as dust, pollen and gaseous pollution, the concentrations and distribution of which are important information particularly for persons suffering from allergies and asthma. In case of an accident radioactive material may be emitted in air, poisonous clouds of gases or particles, volcanic ashes and other substances, the movements of which are required to be known quickly by civil defense authorities.

Prior known environmental measuring systems consist of measuring stations which may be automatic or manned. The information collected by them is transferred in a specific transfer network to central stations, at which distribution and concentration maps are created, as well as weather and other prognoses. The measuring stations and transfer network are usually controlled by authorities and only limited information of the results yielded by them are distributed to the public. Especially information accounting for the needs of an individual is often impossible to provide. To build a dense network of measuring stations is often expensive which limits the geographical coverage of a system according to prior art. The expandability and convertibility of a system often depend on the structure of the measuring stations; it is often impossible to add a new measuring station in an existing system and it requires the building of a new system.

Publication EP 622 625 discloses a system for monitoring air quality through an integrated network of a central site for receiving air-content data from multiple air-content sensors. The air-content sensors are located at air vehicles, ground vehicles, buildings and at potential pollutant emission sites. The air-content data is transmitted to the central site telemetrically through a satellite link, through cellular relay stations and simple radio transmission.

SUMMARY OF THE INVENTION

Now such a system for performing environmental measurements and collecting measuring data has been invented in which the environmental measuring stations are connected to cellular radio network base stations, from which the environmental measuring data can be transferred through the connections of the cellular radio network in order to collect the measuring data from the various measuring stations and to transfer the measuring data to the mobile stations of the cellular network (for example to mobile telephones or pagers). According to a preferable aspect of the invention the environmental measuring station is placed physically on the same site as the base station and is physically connected to with an electrical connection.

By using the environmental measuring system according to the invention it is possible to achieve at a moderate cost good geographical coverage and measuring data can be conveniently transferred to users by transmitting data directly to the mobile stations of the cellular network, and in this way the invention provides the possibility to offer private users personal environmental measuring information services. The system according to the invention can be expanded and modified by utilizing the structure of the cellular radio network.

According to a first aspect of the invention there is provided a system for performing environmental measurements and for transferring measuring data, the system being characterized in that it comprises a plurality of base stations of a cellular radio system, the base stations comprising means for transferring data in the cellular radio system, a plurality of environmental measuring stations each being connected to one of the plurality of base stations, the measuring stations comprising measuring means for performing environmental measurements, and control means for transferring measuring data to the respective base station that it is connected to for transferring the measuring data further over said cellular radio system, and each said environmental measuring station is physically placed on the same site as the base station that it is connected to and is physically connected to the respective base station, a central equipment connected to the cellular radio system for collecting environmental measuring data from the plurality of environmental measuring stations through the base stations of the cellular radio system, and terminal devices of the cellular radio system for receiving data relating to the environmental measurements via the cellular radio system.

According to a second aspect of the invention there is provided a method for performing environmental measurements and for transferring measuring data, the method being characterized in that it comprises the steps of performing environmental measurements in connection with a base station of a cellular radio system and physically on the same site where the base station is located, transferring results representative of the measured environmental data forward to the base station in order to transfer said results further over said cellular radio system, collecting said results at a central location from the environmental measuring station through the base station of the cellular radio system, and transferring data relating to the environmental measurements to a terminal device of the cellular radio system.

In the present invention the existing structures of cellular radio systems are used as the trunk of an environmental measuring system for the placing of measuring stations and the transfer of measurement data. A modern cellular radio system comprises a large number of fixed above the ground base stations forming a dense network: in town areas the base stations are even as dense as a few hundred meters between them, and even in sparsely inhabited areas the distance between them usually is normally no more than approximately 10 to 20 kilometers. They further have telecommunication connections to mobile telephone switching centres, from which it is possible to establish a connection to other networks, such as other mobile communication networks, wired networks and telecommunication networks such as Internet. The base stations further have radio connection to the terminal devices of the network, allowing the distribution of measuring data directly to users.

The measuring system can utilize several different cellular radio systems in order to cover a larger area. The measuring system is administered using a central equipment which preferably has been placed in connection with a mobile telephone switching centre. There may be several area— and/or network specific central equipment systems and the various central systems can communicate with each other in order to collect or compare data from a larger still area. The measuring data from the different measuring stations is transferred through the cellular system to the central equipment, by using which it is possible to create distribution— and concentration maps, as well as weather—and other prognoses. It is possible to transmit environmental information directly to a user's mobile station over the cellular system. This information may be local information from the area of the base station in the area of which the user is at the moment or from a larger area, for example from the area of nearby base stations (measuring stations).

An environmental measuring station according to the invention thus comprises measuring stations connected to the base stations of a cellular radio system. There is at minimum one station and an environmental measuring system for a large area is obtained by connecting measuring stations to several base stations in a large geographical area. The measuring stations have been provided with a desired selection of sensors depending on which environmental phenomena it is desired to measure. The measuring stations may perform measurements continuously, regularly and/or on separate command. All measuring stations need not have the same kind of selection of sensors because desired measuring frequency may vary geographically in regard to different phenomena. For example, it is more important to observe air pollution caused by traffic in town areas than in more remote areas. The measuring station is preferably powered from the same source than the rest of the equipment of the base station.

It is possible to set general alarm limits to the phenomena to be measured, at the exceeding of which the measuring station automatically sends an alarm message to the central equipment collecting measurement data. At other times the measuring station delivers the measured data according to a certain schedule or as a response to a request (command) sent by the central equipment. Also individual users may set personal threshold values in the measuring system, at the exceeding of which values the measuring station in the area of which the user is (or some other predetermined measuring station, e.g. the measuring station of the user's home area) sends through the radio communication part of the base station a personal message to the user's mobile station. The users can also subscribe (to their mobile stations) from the measuring system regional or base station specific measuring reports and local prognoses created based upon them.

A system according to the invention provides a possibility to personal services not only to stationary, but also to moving users. When the user of a moving terminal device moves from the coverage area (cell) of one base station to the coverage area (cell) of another base station, his terminal device (mobile station) performs a shift of base stations, i.e. a so-called handover, in which the terminal device announces to the new base station e.g. its unambiguous identifier. In the system according to the invention a terminal device may, when it arrives in the area of a new base station, announce to the measuring station connected to the concerned base station the individual alarm limits for the phenomena to be measured set by the user (by transmitting the data to the base station), in which case a moving user all the time receives the desired service in spite of the changes of base stations.

It is possible to connect to the system according to the invention, except stationary measuring stations, also moving measuring devices which have radio connection to the nearest base station of the cellular radio system. The system can process in the base station measurement data produced by moving measuring devices alike data produced by a measuring station connected to the base station.

BRIEF DESCRIPTION OF THE DRAWINGS

The invention is described in detail in the following with reference to the preferable aspects presented as examples and to enclosed figures, of which

DETAILED DESCRIPTION

Figure 1:
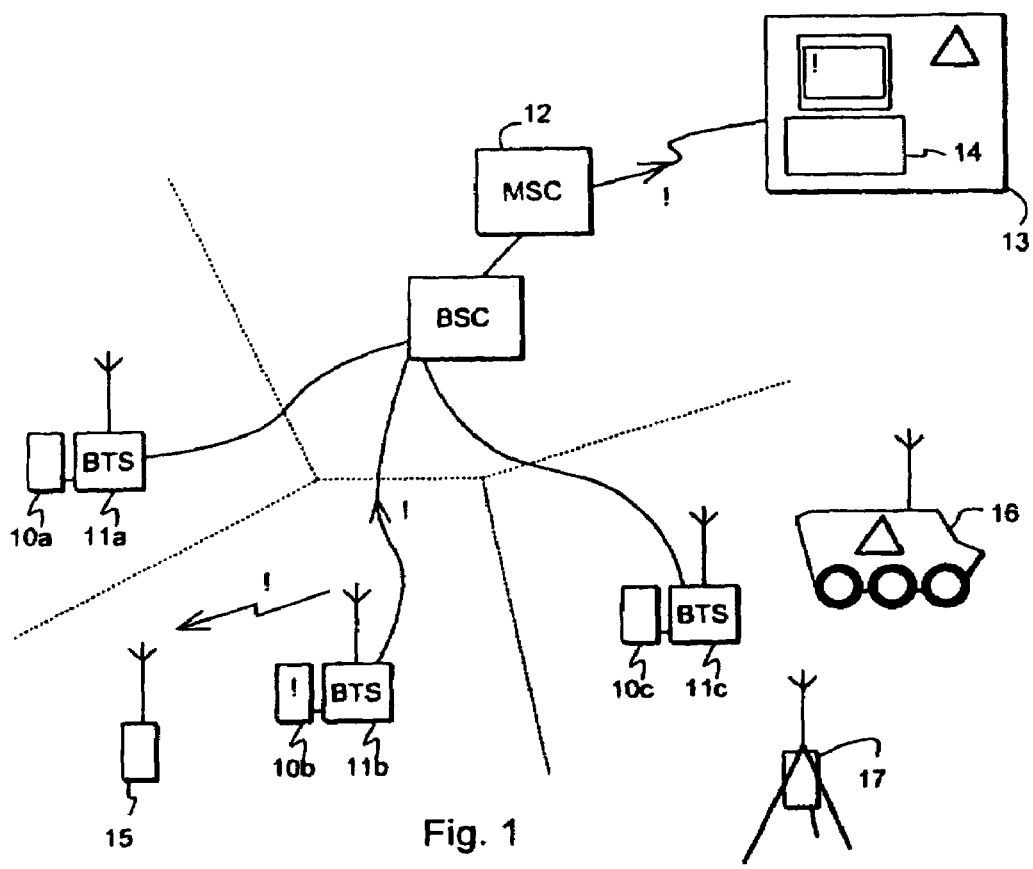
FIG. 1 presents in general terms an environmental measuring system according to the invention.

FIG. 1 presents schematically a cellular radio system with three base stations 11a, 11b and 11c (BTS, Base Transceiver Station), a base station controller (BSC, Base Station Controller) and mobile telephone switching centre 12 (MSC, Mobile Switching Centre). An automatic environmental measuring station 10a, 10b, 10c has been connected to each base station, and the borders of the coverage areas (cells) of the base stations have been marked with dashed lines. There is a telecommunication connection from mobile switching centre 12 to measuring system central equipment 14 which in this case is situated in civil defense center 13. Another preferable location for central equipment 14 is in connection with the net operator's net management equipment, in which case the operator can offer environmental measurement information as a service to the users of the cellular radio system. In the coverage area of the cellular radio system ordinary users carry with them portable terminal devices 15. The figure further presents within the coverage area of the system a moving measuring station which in this case has been placed in civil defense vehicle 16, and separate measuring station 17 which has been erected temporarily by the moving measuring station. Measuring stations 16 and 17 have a radio connection to nearest base station 11c, over which the data from measurements performed by these measuring stations 16 and 17 can be transferred. FIG. 1 is a schematic diagram, highly simplified because of graphic clearness; it is evident to a person skilled in the art that in a real cellular radio system there are more base stations, base station controllers, mobile switching centres and terminal devices. In addition to that there may be more central equipment systems 14 and moving measuring stations and they may be situated in different places and be connected with measuring different phenomena.

The measuring system according to FIG. 1 operates in such a way that automatic measuring station 10a, 10b, 10c connected to each base station 11a, 11b, 11c measures and registers those environmental phenomena it has been equipped to observe, i.e. depending on what kind of sensors have been connected to it. The present invention in no way limits the equipment and operation of the measuring stations in the measuring of various phenomena, because automatic measuring stations of the described type are prior known and are as such of prior art and they can, as it is prior known, be provided with very versatile selections of sensors for different purposes. The measuring may be continuous, time to time, regularly repeated and/or random and it can be focused on for example the earlier mentioned basic phenomena of the atmosphere, the amount of radioactive radiation or on the content of a certain substance in the air. Table 1 below presents examples of different environmental measurements which can be performed in the invention, and of persons/situations who/in which said measuring data can be utilized.

TABLE 1:

Environmental measurements and the usefulness of the results

| Phenomena to be measured | Benefit |
|---|---|
| Outdoors: | |
| Temperature | A user can prepare for the prevailing temperature e.g. in regard to clothing and equip himself with a respirator mask. Useful for travelling. |
| Air humidity | Asthmatic symptoms can vary depending on the humidity of air, i.e. a useful piece of information for an asthmatic. |
| CO, Carbon monoxide | An important information for a person suffering from oxygen-shortage, allowing him to prepare before going out or to a risky area. |
| Pollen | Asthmatics and persons who get allergic symptoms from pollen can avoid areas of high pollen concentration or prepare for the situation by medication. |
| $O_3$, Ozone | High ozone concentration may cause asthmatic symptoms, i.e. a useful piece of information to an asthmatic. |
| Hydrocarbons | Hydrocarbon concentrations characterize the grade of air pollution and high hydrocarbon concentrations may cause asthmatic symptoms, i.e. a useful piece of information to an asthmatic. |
| Dust | Dust may cause breathing difficulties and allergy- and asthma symptoms, i.e. it is a useful piece of information to all persons suffering from such symptoms. |
| Indoors: | |
| (e.g. public premises, working places which often have base stations of their own) | |
| Various chemicals | Various chemicals may cause allergic reactions, poisoning symptoms, and asthma attacks, i.e. the detection of chemical concentration is useful. |
| Dust | Dust may cause breathing difficulties and allergy- and asthma symptoms, i.e. it is a useful piece of information to persons suffering from such symptoms. |

During a normal situation each measuring station reports the measuring results over base station 11a, 11b, 11c connected to it further in the network to central equipment 14. Depending on the structure of the data transfer system the transfer route may be a lot more complicated comprising e.g. parts of wired telephone network, satellite connections, radio links and/or parts of data transfer networks between computers. The transfer of the measured data may take place according to a predetermined schedule or as a response to a request sent by central equipment 14.

In addition to a regular normal reporting each measuring station 10a, 10b, 10c may in a preferable embodiment of the invention be equipped for giving an acute alarm if any of the measured results exceeds a certain alarm limit or if a serious malfunction occurs in the function of a measuring station. The alarm limits can be set and changed using commands from central equipment 14 even individually for each measuring station. In FIG. 1 it has been presumed that measuring station 10b connected to base station 11b detects a measuring result exceeding an alarm limit. In such a case it sends an automatic alarm (ref. !) over base station 11b and mobile switching centre 12 to central equipment 14. An alarm may also be of such nature that it must be immediately informed to ordinary users in order to allow them seek shelter, or that it must be informed to certain professional people moving in the coverage area of the base station whose mobile station numbers are registered in the system. In such a case measuring station 10b transmits over base station 11b also by radio an alarm message which may be addressed to all terminal devices 15 in the area of the base station or only to the terminal devices of said target persons. The exceeding of the alarm limit is reported also through the network to central equipment 14, from which it can be transferred further in the network. In order to that malfunctions should not cause unnecessary false alarms base station 11b may require a confirmation coming from central equipment 14 prior to transmitting an alarm to terminal devices.

Certain measured phenomena are of importance to a small group of users only. For example the pollen concentration of air is an important factor only to those allergic to pollen it is no use to give a common alarm to all users because of high pollen concentration. On the other hand, there are so many people allergic to pollen that it is not useful to store all their mobile station telephone numbers in any centralized database of the measuring system (which is placed for example in central equipment 14 or somewhere else in the network). The invention gives the users a facility to set personal alarm limits to certain measured phenomena. Let us assume that the user of terminal device 15 is allergic to pollen and he has saved in his terminal device the pollen concentration which begins to cause symptoms to him. When he is registered to be within the area of base station, terminal device 15 informs to measuring station 10b the pollen concentration alarm limit by transmitting to base station 11b, in addition to its unambiguous mobile station identifier, the alarm limit of pollen concentration saved by the user. This preferably takes place in connection with the normal signalling which is performed between a mobile station and a base station when a mobile station is registered in the area of a new base station. Base station 11b or some other device maintaining base station specific user registers transfers the information of the alarm limit to measuring station 10b. When measuring station 10b detects a pollen concentration higher than the alarm limit, it informs about it to base station 11b, in which case the cellular radio system identifies based upon the base station specific user register, the user of which terminal device the concerned alarm limit is connected with. The base station transmits a personal pollen alarm to the terminal device of the concerned user for example in form of a short-message or some other text message and/or by establishing a call to the user's terminal device and by informing about the subject using a synthesized speech-message, for example "This is an automatic message from base station 11b, high pollen concentration has been detected in the area". In the GSM —cellular radio system it is known a short message service called SMS.

An alarm or some other information to be delivered to a user's terminal device may be based upon measuring results produced by a single measuring station or by the whole system or by a part of it. The user may, for example, establish a data call to a certain telephone number, from which he obtains as a data transfer the weather conditions in all measuring stations within a radius of one hundred kilometers, connected according to the invention to the base stations of the cellular radio system. If the user's terminal device is equipped with a suitable display, the information can be displayed to the user in graphics form. A user's personal alarms are naturally not limited to the above described pollen alarm, but the measuring system according to the invention can be programmed to give information directed personally to a certain user about any measurable phenomena.

If the user of terminal device 15 moves from the coverage area of base station 11b to the coverage area of base station 11a, the functions determined by the cellular radio system see to that the user is registered under new base station 11a. According to a preferable embodiment of the invention, the terminal device informs in connection with this channel change (so-called handover) the new base station also about the personal alarm limits saved by the user, which limits are saved in the registers concerning the new base station.

Figure 2:
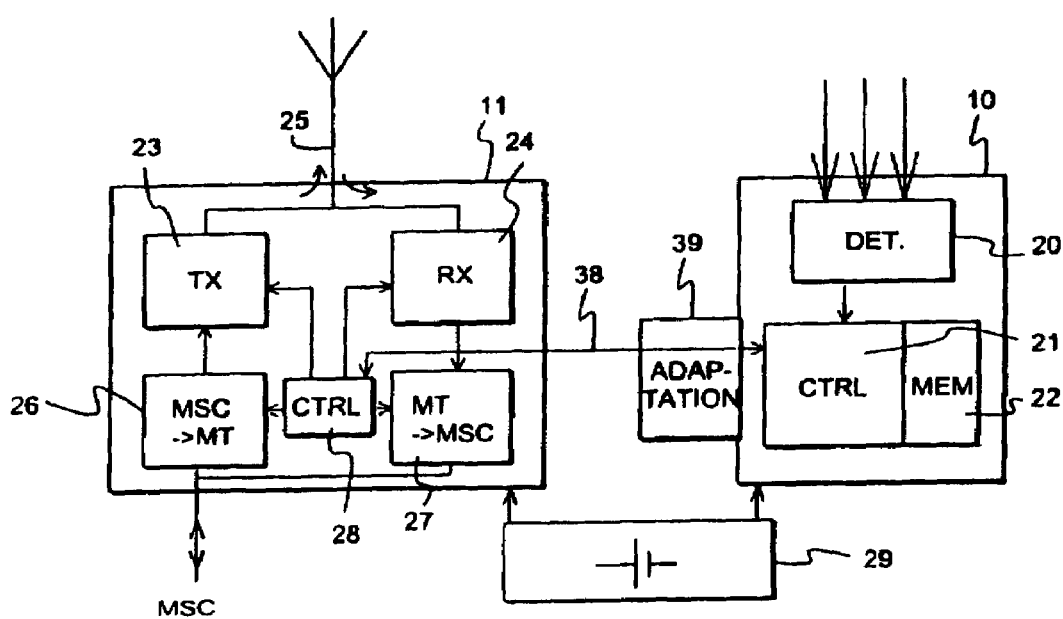
FIG. 2 presents the connecting of a measuring station to a base station.

FIG. 2 presents in more detail a preferable embodiment of the invention for the connecting of automatic measuring station 10 to base station 11 of a cellular radio system. The measuring station comprises sensor unit 20 which may, as described above, comprise several different sensors and means (for example an electronic circuit or a programmed digital signal processor) for processing the measured data into a electrical form suitable for measuring station control unit 21. The operating of the measuring station is controlled by control unit 21 which has at its disposal memory 22 for storing alarm limits and other data having an effect on the measuring and alarm functions. Base station 11 of the cellular radio system is as such of prior art. In comprises transmission part 23 and reception part 24 (comprising the functions required for transmitting and respectively receiving, and for the processing of both baseband and radio frequency signals) which use common antenna 25. The data transfer from a mobile switching centre to terminal devices is handled in block 26 and the data transfer to the opposite direction is handled in block 27. The operating of the base station is controlled by control block 28 and it is powered from power supply 29.

In the case presented in FIG. 2 base station 11 and measuring station 10 have common power supply 29. Measuring station 10 is connected to base station control unit 28 for example through data interface 38 in the base station. Data arriving from the direction of the mobile telephone switching centre to measuring station 10 is transferred from the point of view of base station 11 to measuring station control unit 21 for example as a data call or as a short-message. When the measuring station desires to transmit data over the network (mobile switching centre) to the central equipment, it sends a connection request alike the one of a terminal device registered under a base station establishing a data call connection. The data transfer connection between the measuring station and the base station is preferably established directly between controllers 21 and 28 as presented in FIG. 2. In this case measuring station controller 21 transfers measured data to base station controller 28 which as such carries out the controlling and timing of the base station functions. Between base station 11 and measuring station 10 there is data interface 39 which adapts the data coming from the measuring station into a form suited for the base station and respectively the data coming from the base station into a form suited for the measuring station (e.g. serial format suited also for a computer). This data interface 39 can be for example a data interface realized in the form of a separate data card alike a data interface between a mobile telephone and a computer, which interface is connected between base station 11 and measuring station 10, or it can be integrated in one or the other of the devices. Such a data interface is prior known from publication EP 655 873 and as a product as Nokia Cellular Data Card. Alternatively data interface 39 can be realized in software for example in the measuring station. Such a data interface is prior known from publication WO 96/35286 and as a product as Nokia Cellular Data Suite. Measuring station 10 can as such be independent of the type of cellular radio system. Data interface 39 is arranged according to the cellular radio system (for example GSM, PDC, US-TDMA etc.) to adapt the data into a form suited for the radio system in question. In the embodiment presented in FIG. 2 base station 11 can operate alike a base station according to prior art independently of whether an automatic environmental measuring station has been connected to it or not. Measuring station 10 is permanently registered in the coverage area of base station 11, in which case the system automatically knows which measuring station is concerned.

Alternatively, the connecting of a measuring station in connection with a base station can be made easier by defining between them an electrical an mechanical standard interface. The same applies for the enhancing of the sensor selection of the measuring station: controller 21 has in a preferable case a sensor bus in which any number of sensors can be connected, the identifiers and measuring data of which, describing the object of measuring, are read by the control unit from the sensor bus according to some prior known data bus protocol.

A base station has usually been realized in such a way that the blocks remaining inside block 11 in FIG. 2 are in a cabinet of their own, for example in the lower end of the mast of the base station and antenna 25 has been placed in the top of the mast of the base station. The antenna and the base station cabinet have been connected using a coaxial cable. In the invention measuring station 10 can be set entirely in the vicinity of the base station cabinet and connect together using a suitable cable, because many of the measurements are desired to be made at the level of a person, i.e. in the lower end of the base station mast. On the other hand, some of the measurements are desired to be carried out at a higher altitude, in which case the sensors performing such measurements can be placed in the upper end of the mast of the base station and be connected to the measuring station using a cable.

If there is moving measuring station 16 presented in FIG. 1 in the coverage area of a base station, or permanent or temporary measuring station 17 erected separate from the base station, it is a terminal device from the point of view of the base station. The transfer of messages over the base station to a moving or a separate measuring station and the transfer of alarms from the moving or separate measuring station over the base station to the rest of the system take place as it has been explained above concerning a measuring station in connection with a base station. The operator of the system immediately knows, based upon the base station which transferred a message, from which area a measuring result has arrived. In order to make a more accurate positioning it is naturally possible to include in a message transferring measured data positioning information which dates from a positioning system in connection with the measuring station.

Many of the measured phenomena are so widespread that they do not change significantly in a few hundred meters. Accordingly, it is nor necessary in a town area to connect to each base station a measuring station of its own. If however alarms directed to users can only be obtained through those base stations which have a measuring station, for example when pollen concentration rises in a town area, only those pollen allergies receive an alarm who happen to be with their terminal devices within the coverage area of a base station equipped with a measuring station. This shortcoming can be overcome using an arrangement according to FIG. 3, in which the system interpolates the measuring results for those base stations which do not have an own measuring station.

Figure 3:
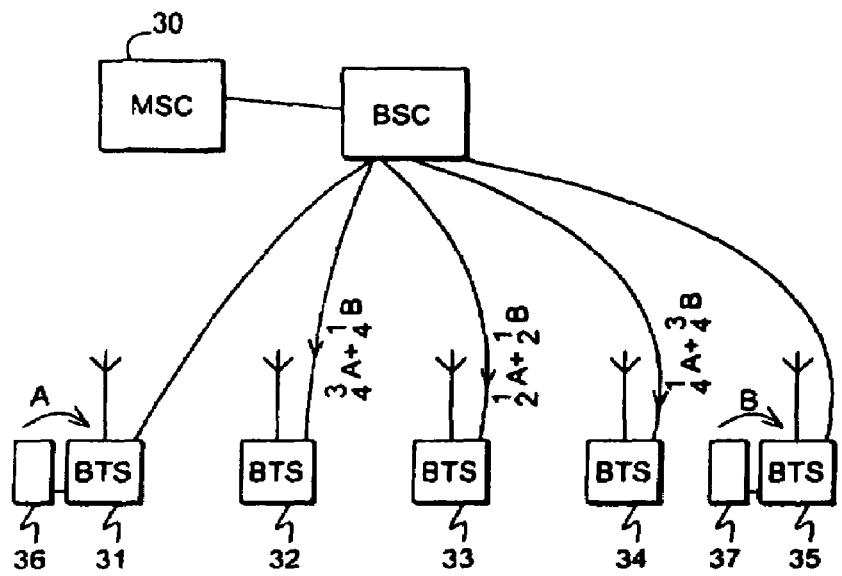
FIG. 3 presents the interpolating of measuring results between base stations.

In FIG. 3 there are five cellular radio system base stations 31, 32, 33, 34 and 35 under base station controller BSC. Because of clearness the location geometry of the base stations has been made one-dimensional, i.e. in the figure it is assumed that the base stations are placed on the same direct line at even intervals. On far left base station 31 there is measuring station 36 yielding figure A as the measuring result of a certain concentration, and on the far right base station 35 there is measuring station 37 yielding figure B as the measuring result of the same measuring. Base stations 32, 33 and 34 between them do not have measuring stations of their own, but the system generates for each base station a measuring result by interpolating results A and B for example as a function of distance or using some air-flow model. If a pollen measuring is concerned, for example a pollen allergic registered under base station 34 receives a personal alarm if measuring result $$\frac{1}{4}A + \frac{3}{4}B$$

exceeds the alarm limit defined by him. The system requires in this case a measuring station/base station application slightly different from that in FIG. 2, because in the embodiment in FIG. 2 the alarm limits have been stored in measuring station specific memory means. In the case of FIG. 3 the alarm limits have to be saved for example in prior known home—and visitor registers (not shown separately in the figure) maintained by mobile telephone switching centre MSC. Always at an update of measuring results the system calculates new interpolated measuring results and compares them per each base station with the data of the users registered under the base station.

Figure 4:
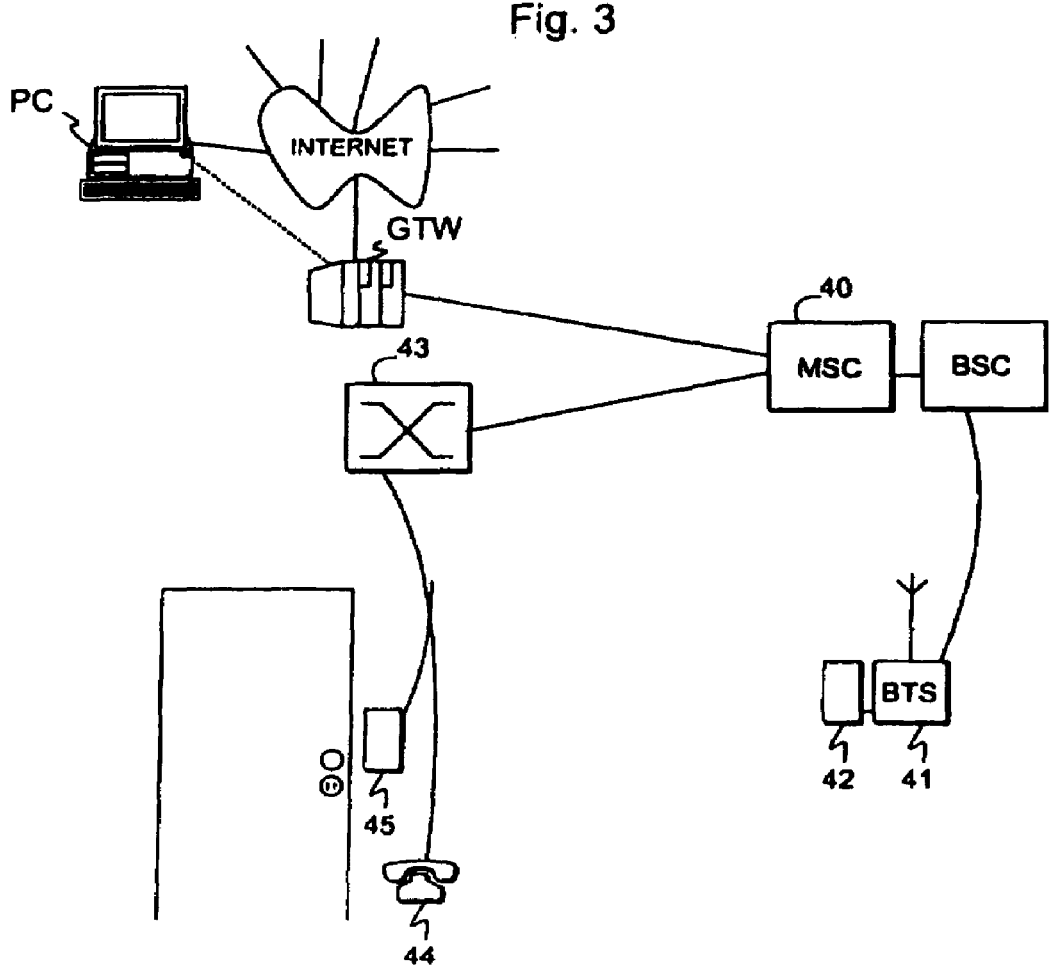
FIG. 4 presents the automatic delivery of measuring results to the users of wired telephone network.

The personal services offered by a system according to the invention need not be limited to serve only the users of the cellular radio system. FIG. 4 presents such an application of the system in which there is a connection from mobile telephone switching centre 40 through base station controller BSC not only to base station 41 and over it to measuring station 42, but also to public wired telephone network exchange 43. Wired telecommunication will keep its position as the telecommunication means of fixed locations, such as homes. In FIG. 4 the terminal device of wired telephone system is represented by telephone 44. The figure further presents special terminal device 45 of wired telephone system, which device is explained in more detail later on.

It is evident that instead of telephone exchange 43 it is possible to have a center of a cable TV system, in which case home terminal 44 would more naturally be a TV-set or the multimedia equipment of a home. The mobile telephone switching centre may also be connected over transfer server GTW either directly or for example over Internet network to computer PC.

In a system according to FIG. 4 the operator of a wired distribution network knows based upon subscriber agreements where the terminal device of each user is situated, and in the case of a telephone, also what is the unambiguous identification number of the terminal device. If the user and the operator have made an agreement on personal alarm limits, they can be stored in the memory og the system either in exchange 43, mobile telephone switching centre 40 or in some other suitable part of the system having memory capacity. When measuring station 40 issues a measuring result the system checks if there are in the coverage area of the base station in question such users of the fixed telecommunication network whose alarm limit is exceeded. If there are, the system generates an alarm to user device 44, 45 over the fixed network (in FIG. 4 the telephone network). If the fixed telecommunication network is a cable-TV network or some other broadcast-type of network, in which messages cannot be directed to any individual user, it can still be used for example for the regional distribution of weather—and other general reports created based upon information produced by an environmental measuring network according to the invention.

Special terminal device 45 which in FIG. 4 is placed indoor, next to the front door of the user's apartment, is a indicator which informs the exiting user about weather conditions and of the exceeding of personal alarm limits if that is the case. Device 45 is connected to a public wired telephone network, a mobile communication network or a paging system, over which it automatically receives for example information about the ozone level of outdoor air, measured by the nearest measuring station of the environmental measuring system according to the invention. The idea in this is that quite a few asthmatic persons react to the ozone in outdoor air and would prefer to prepare for it with suitable advance medication before going out. Ozone meters are not generally available at reasonable cost, and accordingly, this type of service is almost the only possibility to inform persons in the risk group about ozone levels dangerously high for them. In the lobby of most homes there is a telephone socket, in which case it is easy to connect the display device to it or alternatively to a mobile telephone or paging system. This service, alike all other services transferred over telecommunication networks can be tailored for each person, because the operator of the environmental measuring system according to the invention can check, e.g. from the databases of the telecommunication operator, where each installed user terminal is located and which one is the nearest measuring station, from where the information shall be delivered to him. In this way special terminal device 45 may be a telephone set of the wired telephone network, a mobile telephone of a mobile communication network or a pager of a paging system, but preferably it is equipped with a display (for example a largish graphics display), and when a wired network telephone is concerned, equipped with prior known means for receiving text messages. It is also possible to send with terminal device 15 and 45 a separate request to get certain measuring data from a certain area. This can be carried out using for example a short-message in a terminal device connected to a mobile communication network or using a text message in a two-way terminal device of a paging system or in a terminal device connected to a wired network. The request-message is sent to a certain number, for example to a central equipment which processes the request and arranges the sending of the requested measuring data to the terminal device.

Figure 5A:
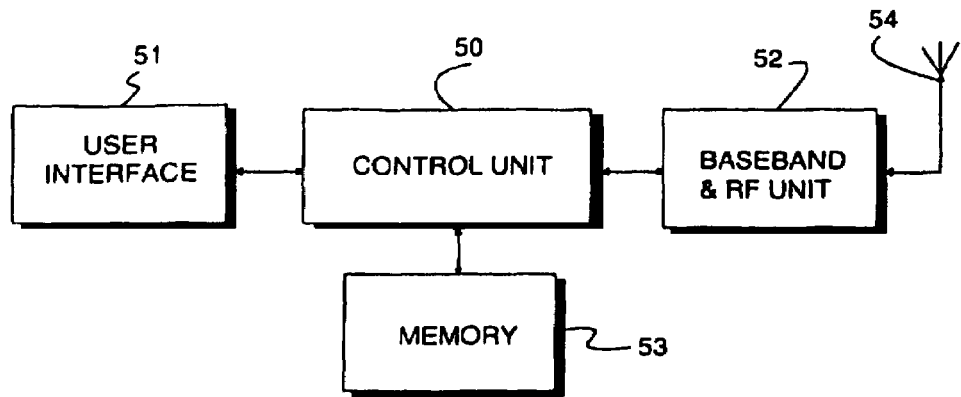
FIG. 5a presents a user terminal applied in the invention.
Figure 5B:
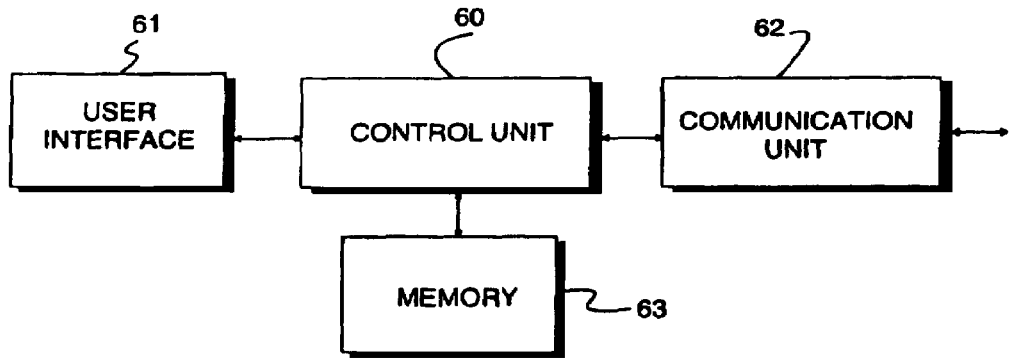
FIG. 5b presents another user terminal applied in the invention.
Figure 6:
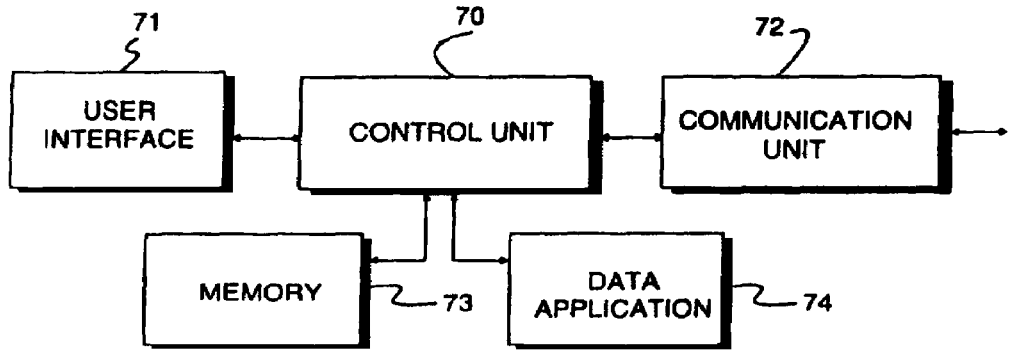
FIG. 6 presents a block diagram of the central equipment used in the system.

FIGS. 5a and 5b present a highly simplified block diagram of terminal device 15, 45 used in the invention, and FIG. 6 presents a simplified block diagram of central equipment 14 used in the invention.

FIG. 5a presents a block diagram of terminal device 45 which has been connected to a mobile telephone network (or a wireless paging system). The device comprises control unit 50 controlling its functions as it is prior known from mobile telephones (and pagers) and memory 53 connected to it for example for storing received measured data. The device further comprises user interface 51 which preferably comprises a display for displaying measured data and for example a keyboard for the operating of the device. The reception of data and eventual transmitting takes place in block 52 performing the processing of baseband and radio frequencies over antenna 54, as it is prior known from mobile telephones (and respectively from pagers).

FIG. 5b presents a block diagram of terminal device 45 which has been connected to a public telephone network. The device comprises control unit 60 controlling its functions as it is prior known from e.g. digital telephones and memory 63 connected to it for example for storing received measured data. The device further comprises user interface 61 which preferably comprises a display for displaying measured data and for example a keyboard for the operating of the device. The reception of data and eventual transmitting takes place using communication block 62 which adapts the data coming from the wired network into a form suited for the control unit as it is prior known from wired telephones.

FIG. 6 presents a block diagram of central equipment 14 which is preferably connected to mobile telephone switching centre MSC, for example in connection with the network operator's network management equipment. In this way the central equipment may be alike the network management equipment, i.e. a computer comprising a measured data reception—and collecting application. The central equipment comprises alike its computer controlling unit 70 controlling its functions, for example a processor and memory 73 connected to it for example for storing received measured data. The device further comprises user interface 71 which preferably comprises a display for displaying measured data and for example a keyboard for the operating of the device. The reception of data and eventual transmitting takes place using communication block 72 which adapts the data coming from the network into a form suited for the controlling unit as it is prior known from computers connected to a telephone switching centre (for example the adaptation of data coming from a serial or parallel port). The device further comprises data application 74, preferably stored in the memory in the form of a program, for the reception, processing and collecting of measured data for creating different distribution—and concentration maps and weather—and other environmental information prognoses. This application 74 can as to this part be alike the prior known central equipment application. The application also comprises, alike a network management device, a possibility to send commands to the network for example in order to command for example a certain measuring station/certain measuring stations to perform certain measurements and for the transmitting of the measured data to the central equipment. For the creating of different kinds of maps data application 74 knows the locations of the environmental measuring stations or base stations, or it can obtain this information from the network management device through communication unit 72.

The environmental measuring system according to the invention has evident advantages compared with prior art, because a good regional coverage can be obtained for the measuring without a high establishing cost. Additionally, the placing of the measuring stations in connection with the base stations of cellular radio system further gives good possibilities to fast and uncomplicated transfer of information both to the central equipment and to individual users. By connecting a measuring station to a base station according to the invention it is obtained a measuring network arrangement which allows the collecting of data from a large area and correspondingly by utilizing the telecommunication network for the transfer of measured data it is possible to supply fresh environmental measuring information to individual persons very quickly. Further, by using the cellular network it is possible to deliver the information about the area in which the user (the terminal device of the cellular network) is at the moment because the measuring is performed in connection with the base station concerned and it is transferred to a terminal device within the area of the concerned base station. A user can through the system according to the invention obtain into this terminal device updated environmental measuring information also about some other place, for example about the one where he shall go. The base stations also already have backed-up power supply, in which case there is also a back-up for the measuring station without an extra power supply unit. A further advantage is that eventual installing and maintenance of the measuring station can be performed in connection with the installing and maintenance of the base station. The density of a mobile communication network has normally been designed based upon the density of users, i.e. the population of the area, in which case, if required, more accurate measuring results are obtained in more densely populated areas, because such areas normally have a higher density of base stations.

The above has been a presentation of the invention and its embodiments utilizing examples. It is self evident to a person skilled in the art that the invention is not limited to the details of the above presented embodiments and that the invention can be realized also in other forms without deviating from the characteristics of the invention. The presented embodiments should be regarded as illustrating but not limiting. Thus the possibilities to realize and use the invention are limited only by the enclosed claims. Thus different embodiments of the invention specified by the claims, also equivalent embodiments, are included in the scope of the invention.

The invention claimed is:

1. A system for performing environmental measurements and for transferring measuring data, wherein the system comprises:
a plurality of base stations of a cellular radio system, each base station forming a cell and the plurality of base stations forming a cellular radio network, the base stations comprising means for transferring data in the cellular radio system, a plurality of environmental measuring stations each being connected to one of the plurality of base stations, the measuring stations comprising measuring means for performing environmental measurements, and control means for transferring measuring data to the respective base station that it is connected to for transferring the measuring data further over said cellular radio system, and each said environmental measuring station is physically placed on the same site as the base station that it is connected to and is physically connected to the respective base station, a central equipment connected to the cellular radio system for collecting environmental measuring data from the plurality of environmental measuring stations through the base stations of the cellular radio system, and terminal devices of the cellular radio system for receiving data relating to the environmental measurements via the cellular radio system.

2. A system according to claim 1, wherein the system comprises a data adapter for adapting the data transferred from the measuring station to the base station into a format suitable for the base station and correspondingly for adapting the data coming from the base station to the measuring station into a format suitable for the measuring station.

3. A system according to claim 1, wherein it comprises in said central equipment means for collecting announcements that are sorted regionally and are based upon the collected measuring data, and for transmitting said announcements to terminal devices over the cellular radio system.

4. A system according to claim 1, wherein the control means of one of the plurality of environmental measuring stations have been arranged to transfer measuring data to a terminal device being in the coverage area of the base station.

5. A system according to claim 1, wherein at least one of said plurality of environmental measuring stations comprises a memory for storing at least one predetermined alarm limit in connection with a certain measurement and means for comparing the measuring data obtained based upon a measurement performed by the measuring means with said alarm limit and for generating an alarm signal when said alarm limit is exceeded.

6. A system according to claim 5, wherein the measuring station is configured to automatically send said alarm signal to the central equipment.

7. A system according to claim 1, wherein the system has been arranged to transfer said measuring data in a data call or in a short-message over the cellular radio system.

8. A system according to claim 1, wherein the measuring system is configured to allow a user of a terminal device to set a personal threshold value in the measuring system, and the measuring system is configured to send through the base station a personal message to the user's terminal device if the set threshold value is exceeded.

9. A system according to claim 1, wherein the measuring system is configured to allow a user of a terminal device to set an individual alarm limit with the terminal device, and the terminal device is configured to send, via the base station to the measuring station, said set individual alarm limit when the terminal device is within the area of the base station.

10. A system according to claim 9, wherein the individual alarm limit is a pollen concentration value.

11. A system according to claim 9, wherein the terminal device is configured to automatically send, via the base station to the measuring station, said set individual alarm limit upon arriving in the area of the base station.

12. A system according to claim 1 wherein each base station of said plurality of base stations is fixed in position.

13. A method for performing environmental measurements and for transferring measuring data, wherein the method comprises the steps of performing environmental measurements in connection with a base station of a cellular radio system and physically on the same site where the base station is located, the base station forming a cell of a cellular radio network, transferring results representative of the measured environmental data forward to the base station in order to transfer said results further over said cellular radio system, collecting said results at a central location from the environmental measuring station through the base station of the cellular radio system, and transferring data relating to the environmental measurements to a terminal device of the cellular radio system.

14. A method according to claim 13, wherein the method further comprises a step of collecting said results through the cellular radio system from environmental measurements at several base stations and creating a regional measuring result based upon them.

15. A method according to claim 13, wherein the method comprises transferring said results over the base station to a terminal device being in the covering area of the base station.

16. A method according to claim 15, wherein the method comprises setting an alarm limit for a certain measurement and transferring said results over the base station to the terminal device as a response to the measured environmental data exceeding said alarm limit.

17. A method according to claim 13, wherein the method comprises transferring said results in a data call or in a short-message over the cellular radio system.

18. A method according to claim 13, further comprising a step, by a user, of setting the terminal device to a personal threshold value, and a step, by the measuring system, of sending through the base station a personal message to the user's terminal device it the set threshold value is exceeded.

19. A method according to claim 13, further comprising a step, by a user, of setting at the terminal device an individual alarm limit, and a step by the terminal device, of sending, via the base station to the measuring station, said set individual alarm limit when the terminal device is within the area of the base station.

20. A method according to claim 19, wherein the individual alarm limit is a pollen concentration value.

21. A method according to claim 19, wherein the terminal device is configured to automatically send, via the base station to the measuring station, said set individual alarm limit upon arriving in the area of the base station.

22. A method according to claim 19, wherein the terminal device is configured to automatically send said alarm limit to central equipment of the cellular radio system.

23. A system for performing environmental measurements and for transferring measuring data, the system comprising:

a plurality of base stations of a cellular radio network and a further plurality of terminal devices in communication with base stations of the network;

a plurality of environmental measuring stations, each of said measuring stations communicating with and having a common location with a respective one of said base stations, each of the measuring stations performing environmental measurements and having a data interface for communication of data of an environmental measurement with the respective one of the base stations;

a central equipment connected to the cellular radio network for collecting environmental measuring data from the plurality of environmental measuring stations through the base stations; and wherein the terminal devices are employed by users of the network for receiving data relating to the environmental measurements via the cellular radio network.

24. A method for performing environmental measurements and for transferring measuring data, wherein the method comprises the steps of:

providing users of a cellular radio network with terminal devices for receipt of data relating to a environmental measurements, the network including a plurality of base stations in communication with the terminal devices;

performing environmental measurements by measuring stations located at respective ones of the base stations and being in communication with the respective ones of the base stations;

at each of the measuring stations, transferring results representative of measured environmental data to the respective base station for further transfer via the network to said terminal devices;

collecting said results at a central location from each of said environmental measuring stations through the base stations of the network; and transferring data relating to the environmental measurements from the central location via the network to individual ones of said terminal devices.

* * * * *